(12) United States Patent
Ogata

(10) Patent No.: US 11,298,822 B2
(45) Date of Patent: Apr. 12, 2022

(54) ROBOT, METHOD OF CONTROLLING ROBOT, AND ROBOT CONTROL DEVICE

(71) Applicant: CANON KABUSHIKI KAISHA, Tokyo (JP)

(72) Inventor: Masaru Ogata, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 277 days.

(21) Appl. No.: 16/247,706

(22) Filed: Jan. 15, 2019

(65) Prior Publication Data
US 2019/0217468 A1 Jul. 18, 2019

(30) Foreign Application Priority Data
Jan. 17, 2018 (JP) .............................. JP2018-005858

(51) Int. Cl.
*B25J 9/16* (2006.01)

(52) U.S. Cl.
CPC ........... *B25J 9/1633* (2013.01); *B25J 9/1651* (2013.01); *B25J 9/1664* (2013.01); *B25J 9/1669* (2013.01)

(58) Field of Classification Search
CPC combination set(s) only.
See application file for complete search history.

(56) References Cited

U.S. PATENT DOCUMENTS

| 9,405,288 | B2 | 8/2016 | Ogata | |
| 2014/0012419 | A1* | 1/2014 | Nakajima | B25J 9/1633 |
| | | | | 700/261 |
| 2016/0039090 | A1* | 2/2016 | Oyamada | B25J 9/163 |
| | | | | 700/253 |
| 2016/0121484 | A1* | 5/2016 | Ikeda | B25J 9/1674 |
| | | | | 700/256 |
| 2016/0271799 | A1* | 9/2016 | Sugio | B25J 9/1664 |
| 2016/0284968 | A1* | 9/2016 | Miyazawa | B25J 9/0087 |
| 2017/0113346 | A1 | 4/2017 | Nagata et al. | |
| 2018/0099421 | A1 | 4/2018 | Ogata | |

FOREIGN PATENT DOCUMENTS

| JP | H01-036303 A | 2/1989 |
| JP | H05-252779 A | 9/1993 |
| JP | H05-261691 A | 10/1993 |
| JP | H10-055207 A | 2/1998 |
| JP | 2001-238483 A | 8/2001 |
| JP | 2001293638 A | 10/2001 |

(Continued)

OTHER PUBLICATIONS

Nov. 30, 2021 Office Action in Japanese Patent Application Pub. No. 2018-005858.

*Primary Examiner* — Jeff A Burke
*Assistant Examiner* — Zachary Joseph Wallace
(74) *Attorney, Agent, or Firm* — Venable LLP

(57) ABSTRACT

A method of controlling a robot having a plurality of joints includes measuring load torque applied to a driving-force transmission system of each of the plurality of joints while moving a hand of the robot along a predetermined path, comparing a measurement value of the load torque and an allowable range of each of the joints, and controlling a rate of change in acceleration of the driving-force transmission system of each of the joints, depending on a comparison result, in a next operation in which the hand of the robot is moved along the predetermined path.

26 Claims, 11 Drawing Sheets

(56) References Cited

FOREIGN PATENT DOCUMENTS

| JP | 2003-117879 A | 4/2003 |
| JP | 2007-301691 A | 11/2007 |
| JP | 2013-000823 A | 1/2013 |
| JP | 2014-014875 A | 1/2014 |
| JP | 2014-014876 A | 1/2014 |
| JP | 2016-028842 A | 3/2016 |

* cited by examiner

ROBOT, METHOD OF CONTROLLING ROBOT, AND ROBOT CONTROL DEVICE

BACKGROUND OF THE INVENTION

Field of the Invention

The present invention relates to a robot, a method of controlling the robot, and a robot control device which control a robot arm driven so as to move along a path determined by a plurality of specified teach points, by using command values sent to driving sources each disposed in a corresponding one of a plurality of joints.

Description of the Related Art

In recent years, industrial robots to perform assembly work in factories are required to increase speed of their motion for increasing production speed and achieving complex motion. For this reason, joints of the robots need to be sharply accelerated and decelerated. The robot includes a reduction mechanism such as a gear, a belt, and a bearing, as transmission components which transmit driving force from a driving source, such as an electric motor, to a joint. However, since the reduction mechanism, among others, generally has low stiffness, it easily vibrates when accelerated and decelerated sharply. When the vibration is exerted on the transmission components, the transmission components will receive excessive load, which is not preferable for durability of robot.

Japanese Patent Application Publication No. 2014-14875 discloses a technique which uses a vibration model of joints, more specifically, a transmission model between jerk (i.e. the rate of change of acceleration in time) and vibration torque caused by elasticity of a joint.

This technique uses the vibration model, calculates vibration torque produced when the joints of a robot are driven, and thereby determines a limiting value of jerk of the joints so that, when the limiting value is not exceeded, the load torque applied to the transmission components is within an allowable range. In addition, a trajectory creation device of the robot creates command values by solving an optimization problem having a limiting inequality. The limiting inequality expresses limiting conditions including a calculated limiting value of jerk of the joints.

With this technique, when the robot is operated, the load torque applied to the transmission components is prevented from exceeding the allowable range.

However, the vibration model between the jerk and the vibration torque described in Japanese Patent Application Publication No. 2014-14875 is a simplified transmission model which is derived on the assumption that the electric motor works so as to nearly perfectly achieve command values, and that the viscosity of the driving system and interfering torque from other shafts are almost zero. Thus, since it is difficult to make the calculated vibration torque exactly equal to a vibration torque produced when the robot is actually operated, free parameters need to be adjusted for each of environment (e.g. temperature) where the robot is used, condition of use, and condition of driving. In addition, the technique cannot cover individual difference of robots and change of a robot over time.

For this reason, in the technique, accuracy and uncertainty of the vibration model are examined in advance by, for example, performing vibration analysis by using a more detailed model, and a control value (jerk limiting value) having a margin is set, depending on the examination. Thus, since the acceleration-and-deceleration control is not optimized for actual operation, the operation time (cycle time) becomes longer when the margin is too large. In contrast, when the margin is insufficient, an allowable torque of each joint may be exceeded, possibly shortening the life of the robot or damaging the robot. Typically, when a maximum allowable torque of a reduction gear is exceeded, the robot may be damaged.

Thus, there has been desired a method of controlling a robot to achieve optimized acceleration-and-deceleration control which protects the driving mechanism for ensuring the life and preventing any damage, and which shortens the cycle time, in accordance with conditions of actual use of each robot.

SUMMARY OF THE INVENTION

According to a first aspect the present invention, a method of controlling a robot having a plurality of joints includes measuring load torque applied to a driving-force transmission system of each of the plurality of joints while moving a hand of the robot along a predetermined path, comparing a measurement value of the load torque and an allowable range of each of the joints, and controlling a rate of change in acceleration of the driving-force transmission system of each of the joints, depending on a comparison result, in a next operation in which the hand of the robot is moved along the predetermined path.

According to a second aspect the present invention, a robot includes a plurality of joints, and a control unit. The control unit is configured to compare a measurement value of load torque measured by a torque sensor disposed in a driving-force transmission system of each of the joints and an allowable range of load torque of each of the joints, while moving a hand of the robot along a predetermined path by controlling the driving-force transmission system of each of the joints, and control a rate of change in acceleration of the driving-force transmission system, depending on a comparison result, in a next operation in which the hand of the robot is moved along the predetermined path.

According to a third aspect the present invention, a robot control device for controlling a robot having a plurality of joints is configured to compare a measurement value of load torque measured by a torque sensor disposed in a driving-force transmission system of each of the joints and an allowable range of load torque of each of the joints, while moving a hand of the robot along a predetermined path by controlling the driving-force transmission system of each of the joints, and control a rate of change in acceleration of the driving-force transmission system, depending on a comparison result, in a next operation in which the hand of the robot is moved along the predetermined path.

Further features of the present invention will become apparent from the following description of exemplary embodiments with reference to the attached drawings.

DESCRIPTION OF THE EMBODIMENTS

Hereinafter, a robot, a method of controlling the robot, and a robot control device of an embodiment of the present invention will be described with reference to the accompanying drawings.

Figure 1:
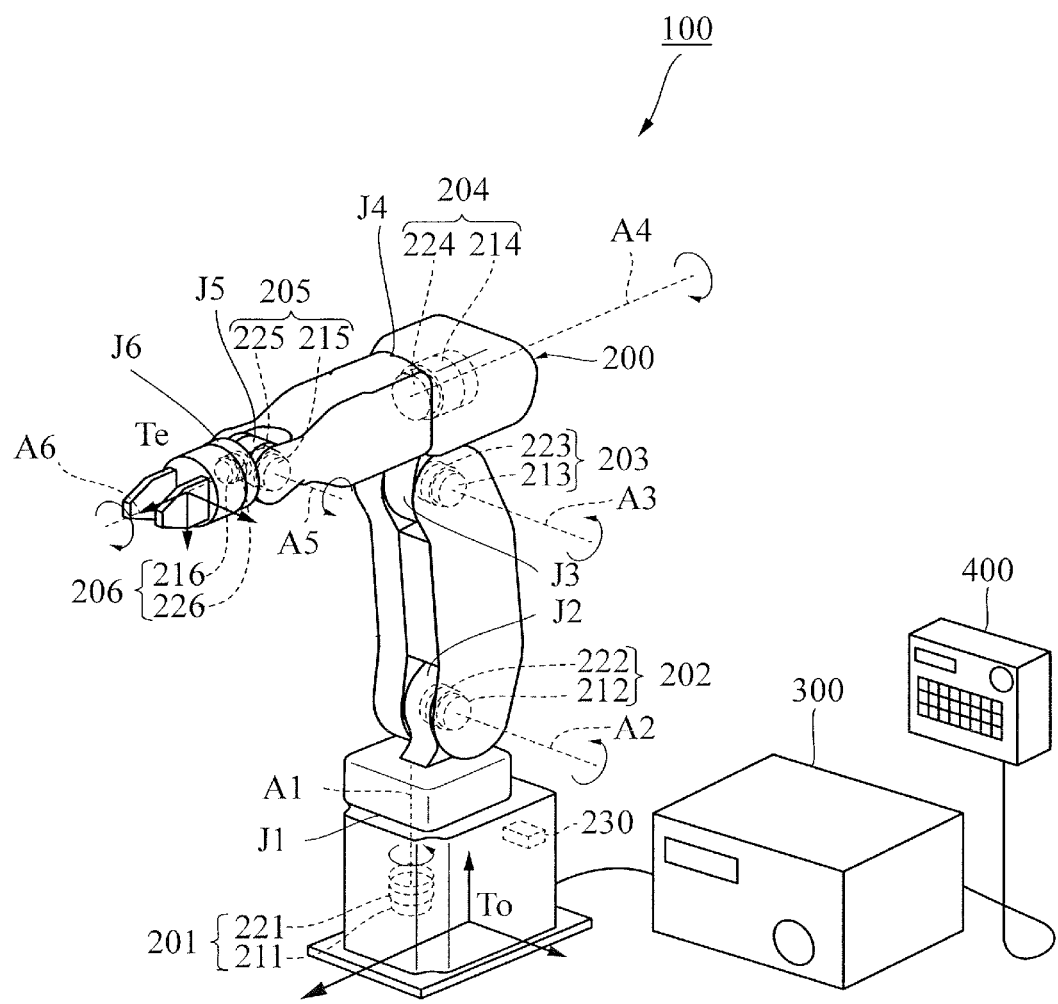
FIG. 1 is a perspective view illustrating a schematic configuration of a robot of an embodiment.

First, a schematic configuration of the robot will be described. As illustrated in FIG. 1, a robot 100 includes a robot arm 200 having a plurality of joints, a robot control device 300 which controls the robot arm 200, and a teaching pendant 400. The teaching pendant 400 is a teaching device to send data on a plurality of teach points to the robot control device 300, and is used for an operator to specify a motion of the robot arm 200.

In the present embodiment, the robot arm 200 has six joints. In addition, the robot arm 200 has six actuators, as driving sources 201 to 206, which rotate joints J1 to J6 on respective joint axes A1 to A6. The robot arm 200 can position its hand or a leading end of the robot arm 200 so that the robot arm 200 takes a posture in any three directions, at any position in three-dimensional space within which the robot arm 200 can move.

The robot of the present embodiment can repeatedly move the hand along a predetermined path. With the motion, a method of manufacturing a product can be performed by, for example, continuously assembling or machining the product.

In general, the position and the posture of the robot arm 200 can be expressed by using a coordinate system. A symbol $T_o$ of FIG. 1 denotes a coordinate system fixed to a base of the robot arm 200, and a symbol $T_e$ denotes a coordinate system fixed to the leading end of the hand of the robot arm 200. In the present embodiment, the driving sources 201 to 206 include electric motors 211 to 216, and sensor units 221 to 226 which are connected to the electric motors 211 to 216. Each of the sensor units 221 to 226 includes an angle sensor to detect an angle of a joint, and a torque sensor to detect a torque of the joint. The driving sources 201 to 206 include respective reduction gears (not illustrated), and are jointed with respective frames, which are driven by the joints J1 to J6 via belts, bearings or the like. Here, the configuration of the driving sources 201 to 206 is not limited to this. For example, hydraulic cylinders may be used.

In the present embodiment, the description will be made, for example, for a case where the joints J1 to J6 are rotary joints. In this case, a position of a joint means an angle of the joint. In addition, a time differentiation of a joint angle is referred to as a speed, an acceleration, or a jerk of the joint, depending on a degree of the derivative.

Here, the joints may be prismatic joints, as another example. In this case, a position of a joint means a position of the prismatic joint.

The robot arm 200 includes a servo control unit 230, which serves as a drive control unit to control the driving of the electric motors 211 to 216 of the joints. The servo control unit 230 receives position command values, causes current to flow in the electric motors 211 to 216 depending on the received position command values so that the electric motors 211 to 216 move in accordance with the angle command values for the joints J1 to J6, and thereby controls operation of the electric motors 211 to 216. Here, although FIG. 1 illustrates the single servo control unit 230, a plurality of servo control units may be provided corresponding to the electric motors 211 to 216, and may be individually controlled for corresponding joints.

The robot control device 300 receives data on a plurality of teach points (i.e. a series of teach points) from the teaching pendant 400. The robot control device 300 creates position command values at predetermined intervals, in accordance with the teach points; and outputs the position command values to the servo control unit 230 at the predetermined intervals so that the joints J1 to J6 of the robot arm 200 move sequentially in accordance with the plurality of teach points.

The teach points are vectors (teach point vectors), which contain teach position information on the joints J1 to J6, as vector components. In addition, the position command values determined in the robot control device 300 are vectors, contain target position information of the joints J1 to J6, as vector components. That is, the robot control device 300 calculates a continuous path (CP) trajectory by using the received data on the teach points, creates a plurality of position command values in accordance the trajectory, and outputs the position command values to the servo control unit 230 at predetermined intervals.

In this time, as described later, the robot control device 300 performs an optimizing process in which passage speed is adjusted at each point on the trajectory, which is determined by the given series of teach points. Here, the adjustment is performed such that the limiting conditions on speed, acceleration, and torque of the joints J1 to J6 of the robot arm 200 are satisfied.

Figure 2:
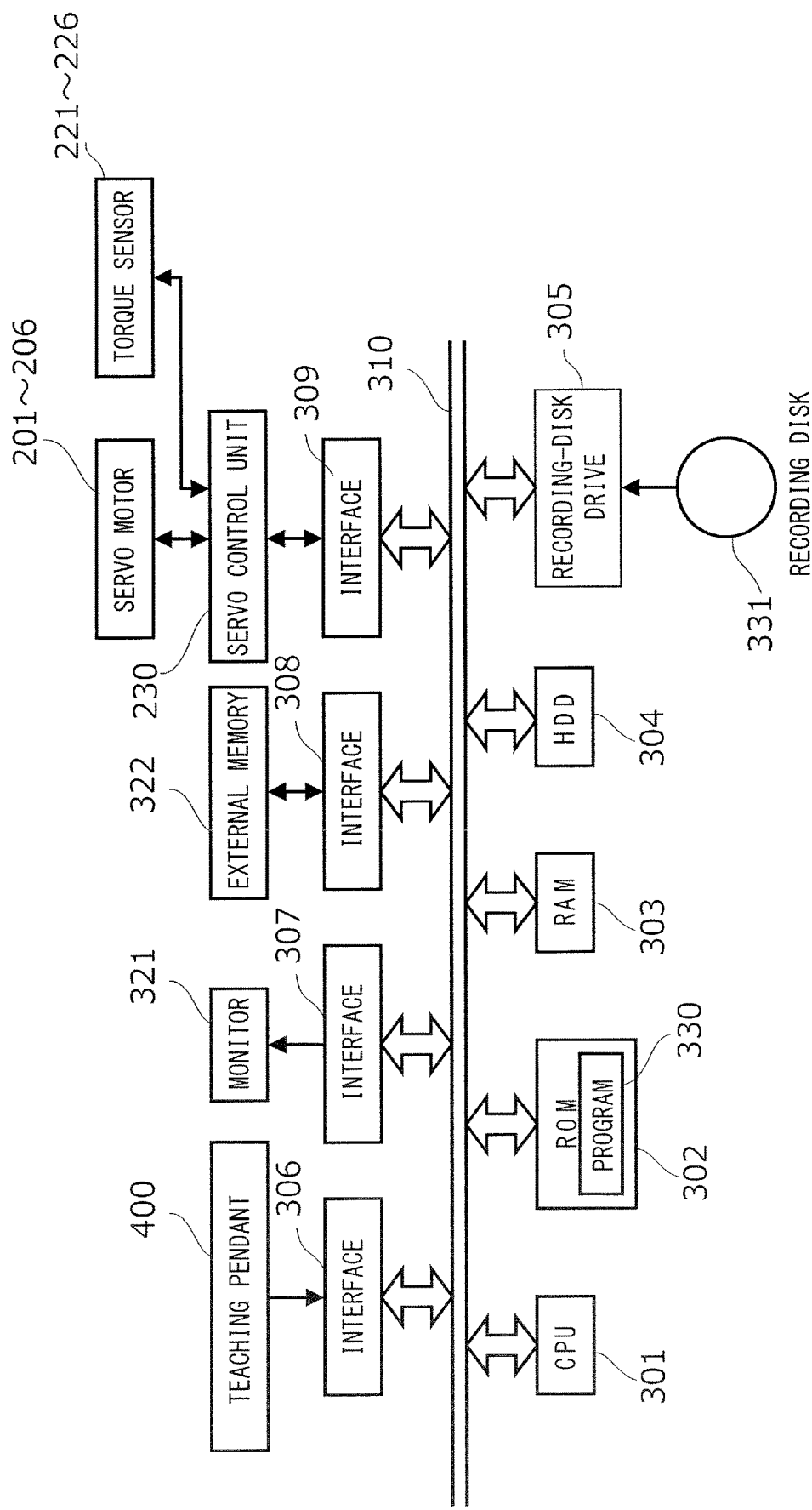
FIG. 2 is a block diagram illustrating a configuration of a robot control device of the embodiment.

FIG. 2 is a block diagram illustrating a schematic configuration of the robot control device 300. The robot control device 300 includes a CPU 301, a ROM 302, a RAM 303, a hard disk drive (HDD) 304, a recording-disk drive (recording medium) 305, and various interfaces 306 to 309. The CPU 301 serves as a control unit; the ROM 302, the RAM 303, the HDD 304, and the recording-disk drive 305 serve as storage units.

The CPU 301 is connected with the ROM 302, the RAM 303, the HDD 304, the recording-disk drive 305, and the various interfaces 306 to 309, via a bus 310. The ROM 302 stores a program 330 which causes the CPU 301 to operate. The program 330 may be stored in any recording medium as long as the recording medium is a computer-readable recording medium. For example, a ROM, a disk, or an external memory (not illustrated) may be used as the recording medium that provides the program 330 to a computer. Specifically, a flexible disk, an optical disk, a magneto-optical disk, a magnetic tape, a nonvolatile memory such as a USB memory, an SSD, or the like may be used as the recording medium. The RAM 303 can temporarily store data, such as computation results by the CPU 301. The HDD 304 stores computation results and various types of data (including data on an indicated best trajectory and an estimated best value).

The teaching pendant 400 is connected to the interface 306; and the CPU 301 receives teach point data from the teaching pendant 400, via the interface 306 and the bus 310.

The servo control unit 230 is connected to the interface 309; and the CPU 301 outputs data on target angles of the joints to the servo control unit 230 at predetermined intervals, via the bus 310 and the interface 309.

The monitor 321 is connected to the interface 307, and displays various images. The interface 308 can be connected with an external memory 322, such as a rewritable nonvolatile memory or an external HDD. The recording-disk drive 305 can read various types of data and a program stored in a recording disk (recording medium) 331. Here, examples of the recording medium of the present invention, in which a program is stored, are not limited to the recording disk 331; and include a nonvolatile memory such as the external memory 322, and an external HDD.

Figure 3:
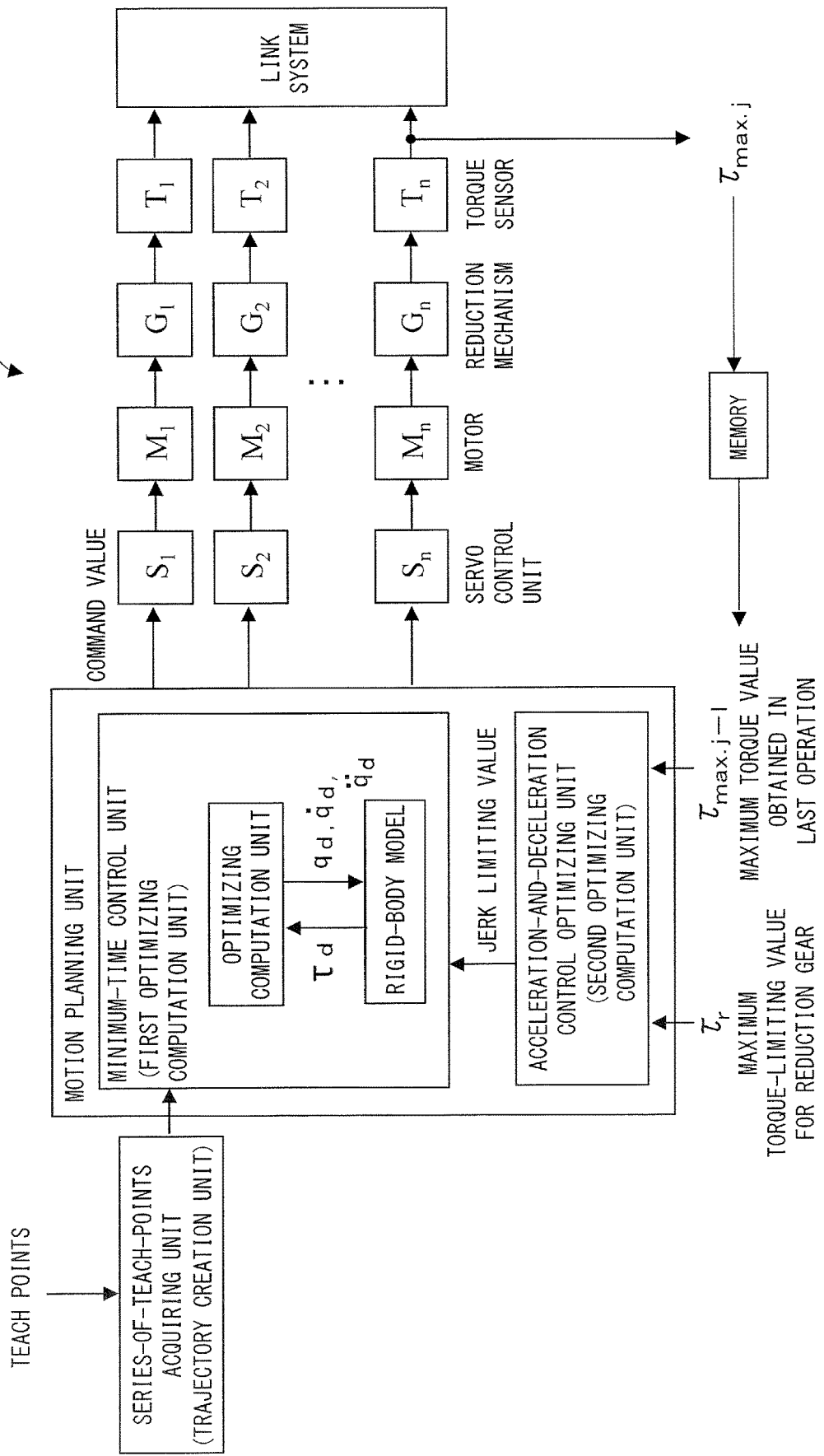
FIG. 3 is a block diagram illustrating a configuration of a control unit of the embodiment.

FIG. 3 is a block diagram schematically illustrating a relationship between a hardware configuration and a control system of the robot. With reference to FIG. 3, an outline of the optimum adjustment method of the acceleration-and-deceleration control of the present invention will be described.

The six joints J1 to J6 of the robot respectively include electric servo motors M1 to M6, reduction mechanisms G1 to G6, and torque sensors T1 to T6, which are illustrated in FIG. 3.

The torque sensors T1 to T6 are each interposed between an output edge of a corresponding reduction mechanism and a link of the robot. Each of the reduction mechanisms G1 to G6 reduces the number of rotations of a corresponding servo motor, and increases an output torque of the motor into a torque suitable for driving a corresponding joint of the robot.

The reduction mechanisms Gn (n=1 to 6) each include a strain-wave-gearing mechanism.

Here, a timing belt-and-pulley system or a gear mechanism, which is a power transmission mechanism to transmit the output power from a motor to a reduction mechanism, may be provided between the motor and the reduction mechanism.

The torque sensors Tn (n=1 to 6) each include an elastic member which deforms depending on the torque applied, and thus directly measure the output torque of a joint, that is, the torque to drive a link, by detecting the amount of deformation or the amount of distortion of the elastic member. In general, the torque efficiently generated by a small electric motor is much smaller than the torque required to drive a joint, and the rotational speed generated by the small electric motor is much higher than the rotational speed required to rotate the output shaft of the joint. Thus, a reduction mechanism having a high reduction ratio is needed. However, with the reduction of speed, torque loss increases due to friction and resistance in rotation in the driving portion. So, with only the motor torque measurement or the motor current measurement which measures motor current proportional to the motor torque, the output torque of the joint cannot be accurately obtained. For this reason, the torque sensor is provided between the reduction mechanism and the link to accurately obtain the torque which is applied to the output edge of the reduction mechanism. While the robot hand is moved along a predetermined path, the measurement value of load torque which is measured by the torque sensor disposed in the driving-force transmission system (the driving-force transmission mechanism) of each joint is sent to the robot control device 300.

The motion and the force of each joint are controlled by each of servo control units S1 to S6 disposed in the joints.

One driving-force transmission system, disposed in a joint and including these components, drives each of the links of the robot, supported by a joint supporting mechanism (bearing). When the one and the other driving-force transmission systems are controlled as a whole, the robot moves and outputs its power.

The command values sent from the robot control device to the servo control units of the joints at predetermined intervals, such as every 1 ms, are created in a motion planning unit of the robot control device 300. The motion planning unit includes two optimizing calculation units which are a minimum-time control unit (first optimizing calculation unit) and an acceleration-and-deceleration control optimizing unit (second optimizing calculation unit).

A series-of-teach-points acquiring unit (path creation unit) uses the teach point information indicated by the teaching pendant and performs interpolation on the teach points to obtain information on a series of teach points (or a path) which is a series of created teach points.

The minimum-time control unit adjusts and optimizes passage speed on the path, defined by the series of teach points given by the series-of-teach-points acquiring unit, under limiting conditions. The limiting conditions include upper limits and lower limits of speed, acceleration, motor torque, and joint torque of the joints. When determining optimum command values, the minimum-time control unit uses not only the above-described limiting conditions but also a jerk limiting value received from the acceleration-and-deceleration control optimizing unit, as a limitation on acceleration and deceleration. The minimum-time control unit then solves an optimization problem having the jerk limitation which is one of limiting inequalities, and thereby computes the trajectory. Here, the jerk is the rate of change of acceleration in time.

The limiting conditions of the optimization problem further include the following conditions in addition to the upper and lower limits of jerk. That is, there are included, for example, the equation of motion of robot necessary to produce a motion which can be dynamically achieved while keeping physical consistency, upper and lower limits of the number of rotations of the joints and the motors, and upper and lower limits of torque of the joints and the motors, which are necessary to prevent damage and shortened life of components.

As described in detail later, solving the optimization problem is to determine a convergence value which substantially minimizes the operation time (cycle time) of the robot while satisfying the above-described limiting conditions.

While the robot repeats actual work, the acceleration-and-deceleration control optimizing unit adjusts the jerk limiting value, which is sent to the minimum-time control unit, and thereby searches for an optimum limiting value. As described in detail later, the optimum limiting value is a jerk limiting value which substantially minimizes the operation time of the robot in a state where the torque values outputted by the joint torque sensors are within an allowable range, that is, in a state where a desired life of the mechanisms is ensured.

The acceleration-and-deceleration control optimizing unit acquires the torque values outputted by the torque sensors when the robot performs actual cycle operation, and compares a maximum absolute value $\tau_{max}$ of the torque values, with a predetermined maximum allowable torque value $\tau_r$. Depending on the comparison result, the acceleration-and-deceleration control optimizing unit determines a jerk limiting value which will be used in the minimum-time control unit for the next cycle. That is, the acceleration-and-deceleration control optimizing unit repeats the jerk adjustment to make the difference between $\tau_r$ and $\tau_{max}$ as small as possible.

By repeating the adjustment, the acceleration-and-deceleration pattern is optimally adjusted to substantially minimize the operation time while the torque to drive the robot is within a predetermined range and durability of the robot is ensured. As in the minimum-time control unit, the maximum allowable torque value $\tau_r$ is determined depending on a desired life of components of the robot. For example, the maximum allowable torque value $\tau_r$ may be determined with reference to a value in specifications specified for a rated torque of the reduction mechanism.

Next, with reference to FIGS. 4 to 8, concrete operational procedures for the optimizing control of acceleration-and-deceleration pattern of the present invention will be described. The description will be made for a case where a robot performs assembly process in an actual production site.

Figure 4:
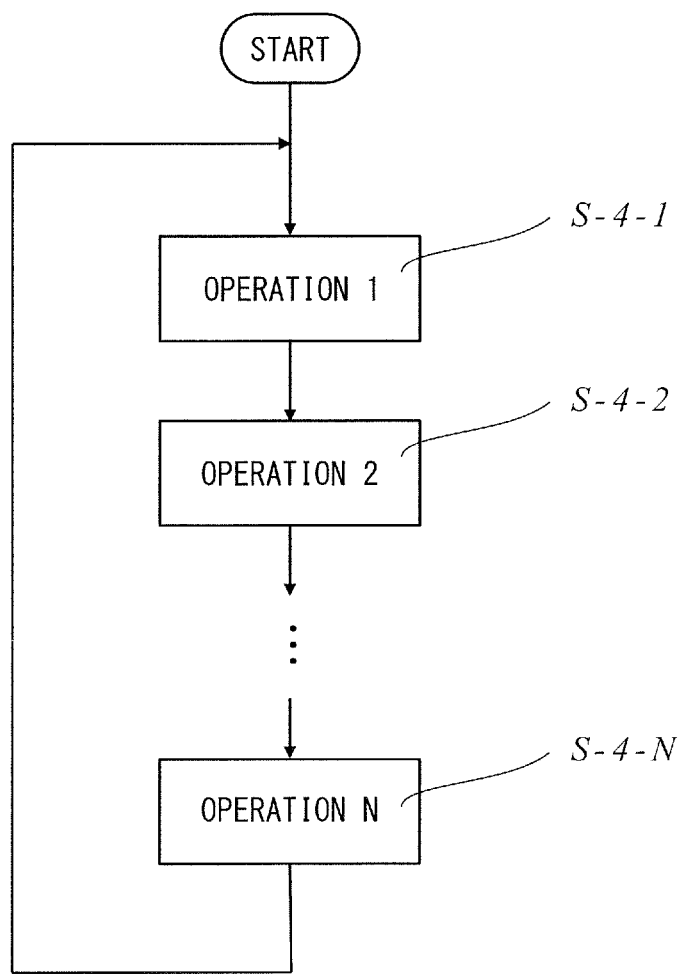
FIG. 4 is a flowchart illustrating a series of operations of the robot of the embodiment.

As illustrated in the flowchart of FIG. 4, a series of assembly processes of the present embodiment has N number of unit operations. For example, the unit operations (Operations 1 to N) include an approaching operation to approach and pick up a workpiece, a workpiece holding operation, a workpiece picking-out operation, a moving operation to move the workpiece to an assembly position, and an assembly operation to mount the workpiece on an assembly. As illustrated in FIG. 4, the series of processes are repeated such that, after the last operation (Operation N: Step S-4-N) is completed, the first operation (Operation 1: Step S-4-1) is restated and the other operations are repeated. The operations are repeated until a desired number of products are produced, or until some trouble is caused during the processes.

The optimizing control of acceleration-and-deceleration pattern of the present embodiment optimizes the acceleration and deceleration (the jerk limiting value) for each operation to optimize (minimize) the cycle time of the whole series of assembly work.

Figure 5:
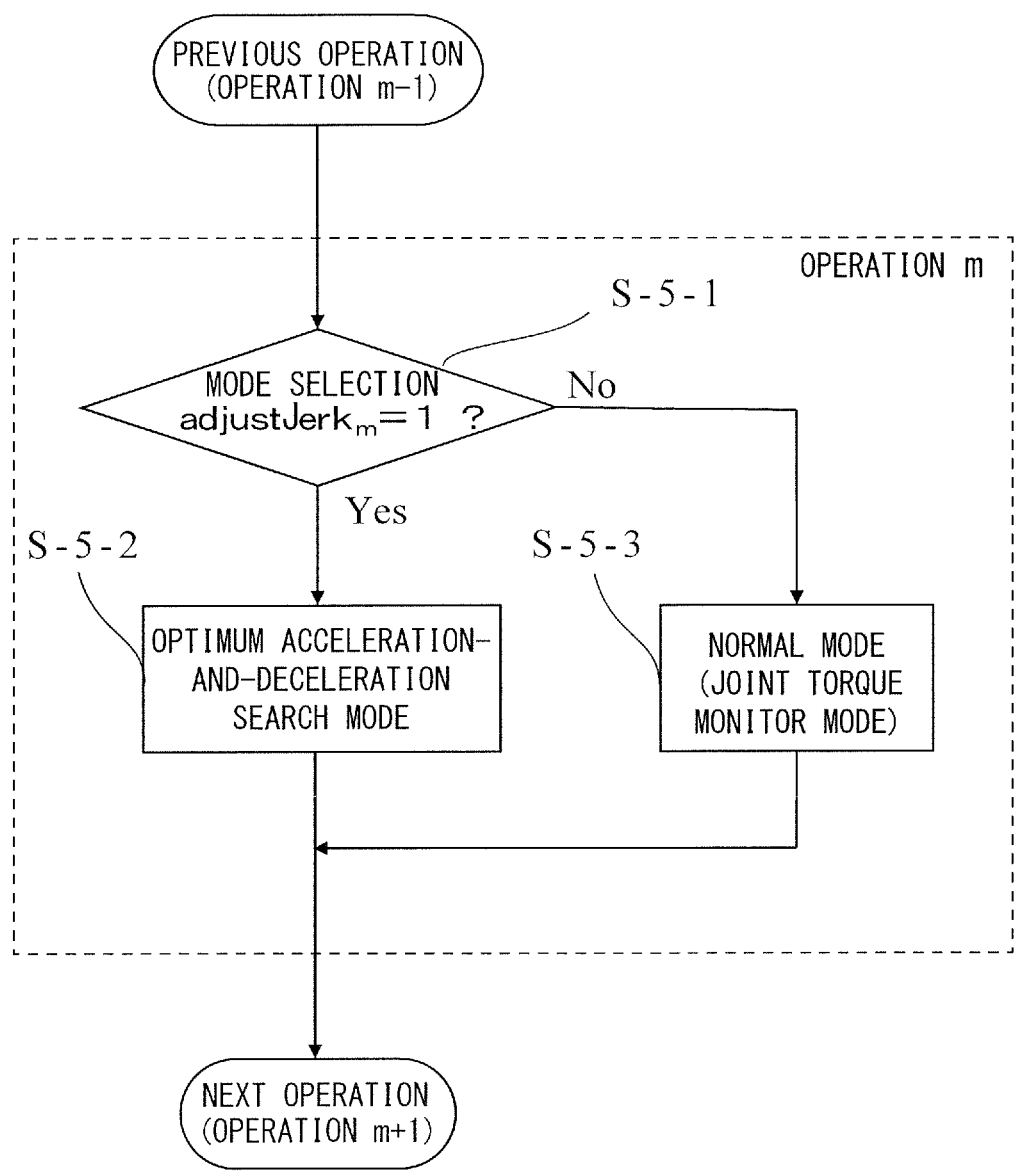
FIG. 5 is a flowchart illustrating operation modes and switching for the operation modes, of a unit operation of the robot of the embodiment.

The flowchart of FIG. 5 illustrates the m-th operation (1<m<N), as one of the series of operations of FIG. 4. As illustrated in FIG. 5, each of the operations has two operation modes of an optimum acceleration-and-deceleration search mode (S-5-2) and a normal mode or a joint torque monitor mode (S-5-3). The robot control device has an operation-mode switching flag adjustJerk$_m$ (m is an operation number) to manage the switching between the two operation modes.

After completing the previous operation (Operation m−1), the robot control device checks the operation-mode switching flag adjustJerk$_m$ when starting the current operation (Operation m) (S-5-1).

The robot control device executes the optimum acceleration-and-deceleration search mode (S-5-2) when the flag adjustJerk$_m$ is 1 in Step S-5-1, or executes the normal mode (S-5-3) when the flag adjustJerk$_m$ is 0.

As described later, the value of the operation-mode switching flag adjustJerk$_m$ is determined at the end of the previous operation cycle, depending on the possibility of convergence of the jerk limiting value and change in the torque $\tau_{max}$ obtained when the robot is driven. Since the initial value of the operation-mode switching flag adjustJerk$_m$ is 1, the optimum acceleration-and-deceleration search mode is executed when the robot executes Operation m for the first time.

As described above, the robot control device executes either the optimum acceleration-and-deceleration search mode or the normal mode (joint torque monitor mode) in each operation, and then transitions to the next operation (Operation m+1).

Figure 6:
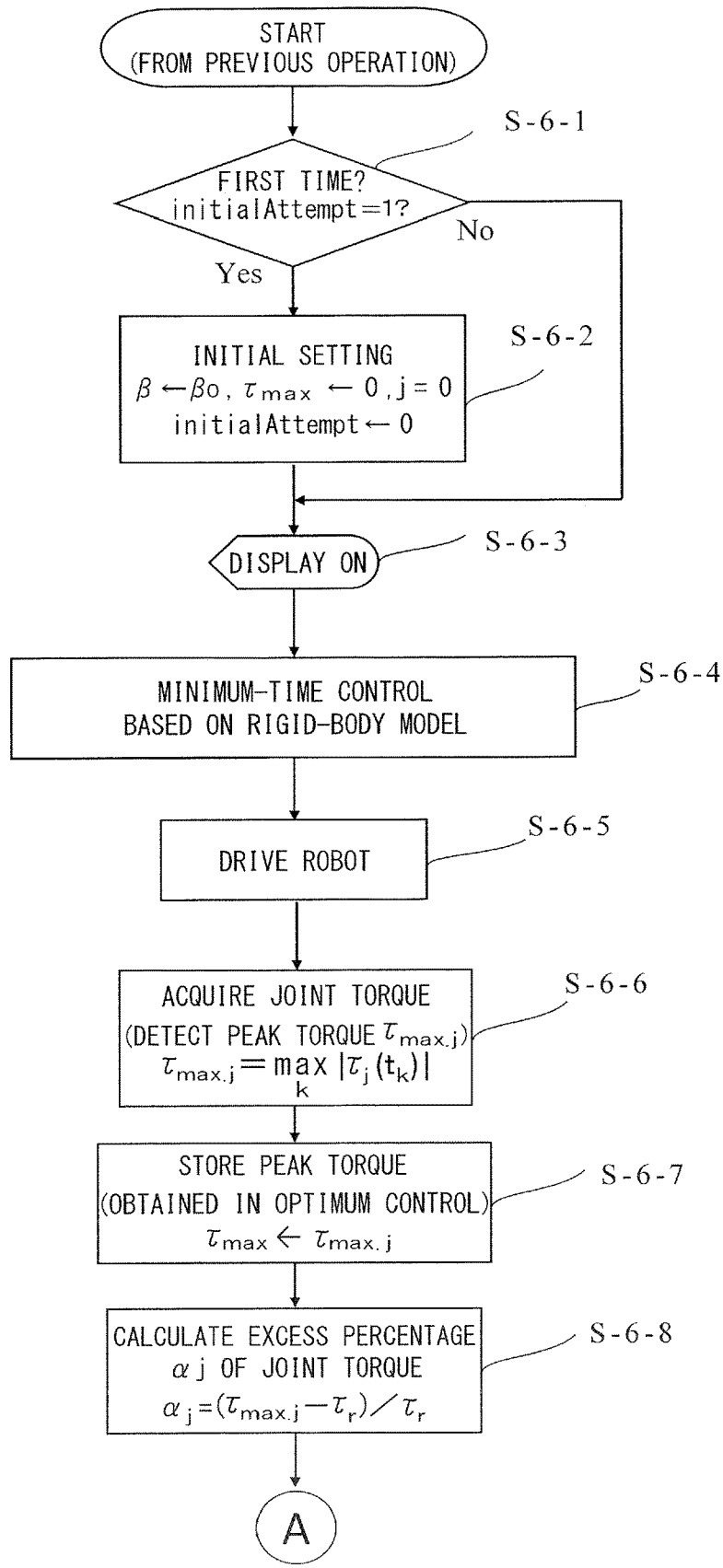
FIG. 6 is a flowchart of the first half of an optimum acceleration-and-deceleration search mode (i.e. control for optimizing acceleration-and-deceleration adjustment) of a unit operation of the embodiment.
Figure 7:
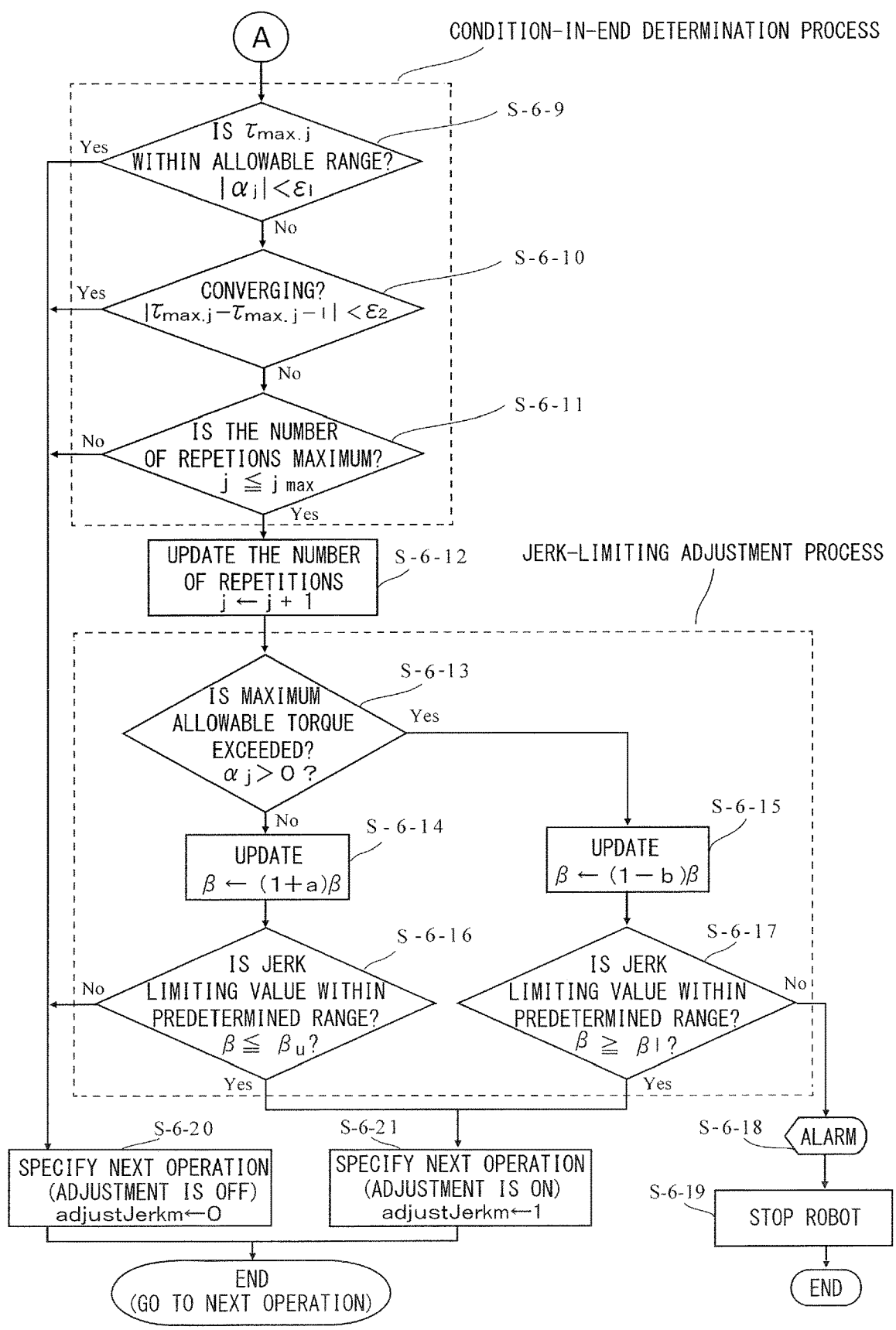
FIG. 7 is a flowchart of the second half of the optimum acceleration-and-deceleration search mode (i.e. control for optimizing acceleration-and-deceleration adjustment) of the unit operation of the embodiment.

Next, with reference to FIGS. 6 to 9, the operation modes will be described in detail. FIGS. 6 and 7 are flowcharts illustrating an operational sequence of the optimum acceleration-and-deceleration search mode. For convenience of illustrating the figures, the continuous flow is divided, at a point A, into two flows illustrated in FIGS. 6 and 7. The flowchart illustrates one of the operations of the robot which the robot repeats along an identical path, as illustrated in FIG. 4. The number of repetitions is represented by a symbol j, and the number j is 0 when the robot performs Operation m for the first time.

When the robot starts Operation m and executes the optimum acceleration-and-deceleration search mode, the robot control device determines whether this operation is performed for the first time (S-6-1). This determination is performed by using a flag initialAttempt (the initial value of the flag initialAttempt is 1 when the operation program for the robot is started).

The robot control device proceeds to Step S-6-2 if this operation is performed for the first time (S-6-1: Yes), or skips Step S-6-2 and proceeds to Step S-6-3 if not (S-6-1: No).

When the operation is performed for the first time and the robot control device proceeds to Step S-6-2, the robot control device sets 0 to the flag initialAttempt and the number j of repetitions, and initializes parameters used for trajectory planning for the robot (that is, used for creating an acceleration-and-deceleration pattern of command values). Specifically, when the trajectory setting parameters are initialized, a default parameter $\beta_0$ is set to a jerk limiting value $\beta$ used to plan the trajectory of the robot ($\beta_0 \rightarrow \beta$).

In Step S-6-3, a status lamp of the robot is turned on to indicate that the robot is in the optimum acceleration-and-deceleration search mode.

The robot control device then proceeds to Step S-6-4, and executes computation on the minimum-time control based on a rigid-body model, by using the jerk limiting value which has been set. With this computation, the robot control device creates an optimum trajectory in accordance with a given path, and creates command values sent to the servo control unit.

Figure 9:
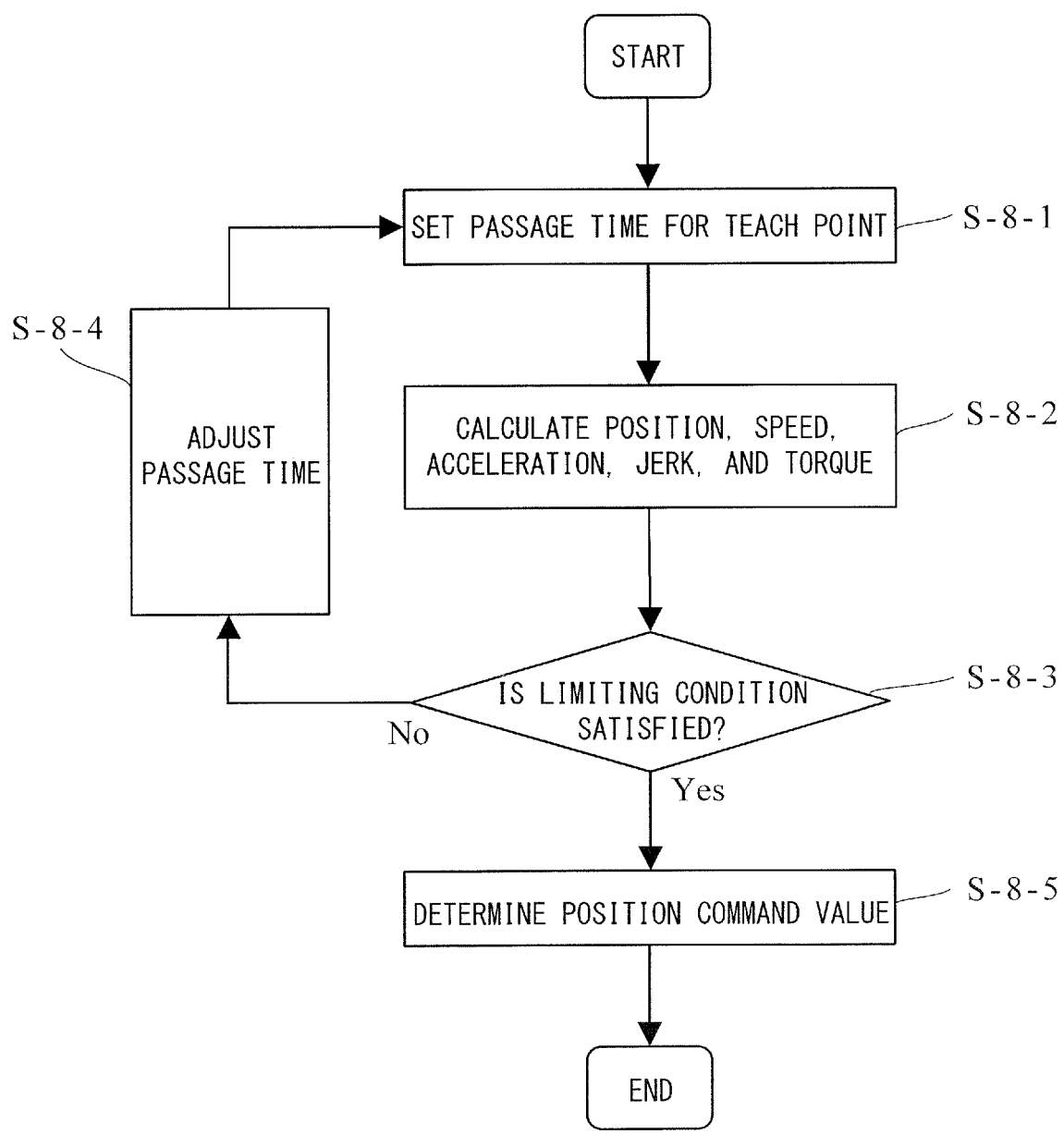
FIG. 9 is a flowchart illustrating a command-value computing process of the optimum acceleration-and-deceleration search mode (control for optimizing acceleration-and-deceleration adjustment) of the embodiment, performed by a minimum-time control unit.

The computation performed by the minimum-time control unit for creating the command values will be described with reference to the flowchart of FIG. 9. As illustrated in FIG. 9, the minimum-time control unit first sets a passage time t for each of the series of teach points (S-8-1). 1). Then robot control device calculates a position (angle), a speed, an acceleration, a jerk, and a torque of a joint at each teach point, with reference to a corresponding passage time which has been set (S-8-2). The torque of a joint can be calculated by substituting values of joint position, speed, and acceleration in the equation of motion of the robot arm 200, and by performing calculation based on inverse kinematics (i.e. by performing one kind of simulation).

Then the minimum-time control unit determines whether the position, speed, acceleration, torque, and jerk of each joint calculated in the above-described Step S-8-2 are within limiting ranges which have been set (S-8-3).

If the limiting conditions are not satisfied, the minimum-time control unit adjusts the passage time at each teach point again (S-8-4). For example, when a limiting condition for load torque is exceeded, the minimum-time control unit delays the passage time, and then repeats the above-described steps S-8-1 to S-8-3. With these operations, the optimization problem having limiting conditions as limiting inequality is solved. Here, the limiting conditions include the above-described jerk limiting value of each joint. If the limiting conditions are eventually satisfied (S-8-3: Yes), the minimum-time control unit creates command values for the joints for achieving a minimum time (S-8-5).

In the minimum-time control step (S-6-4) of FIG. 6, such computation creates the trajectory of command values which minimizes the operation time of the robot, by simulating the rigid-body model of the robot.

Here, the simulation for calculating torque is performed by using the rigid-body model which does not take into account the flexibility of a joint of the robot. This is because simulation which takes the elasticity into account needs higher calculation cost than the rigid-body simulation, and thus is not suitable for repeated calculation, such as the optimizing calculation. If creating one trajectory for one operation takes a few minutes for example, a total time for all operations will be impractically longer. Thus, the simulation which takes the elasticity into account cannot be practically used in real time in production site. In addition, since the minimum-time control itself takes time even with the rigid-body model, the calculation time will be on the order of a few hundred milliseconds to a few seconds, for example. For this reason, to increase productivity, it is desirable to make the number of times of the trajectory planning as small as possible, in the minimum-time control.

In Step S-6-5, the robot control device actually moves the robot in accordance with the trajectory calculated in Step S-6-4. A created joint-angle command value is sent to the servo control unit of each joint at a sampling time of $t_k$. The servo control unit of each joint actuates a positional servo mechanism so that an angle value of each joint follows a given position command value, and actually moves the robot to cause the robot to perform work.

While the robot actually works, each of the torque sensors disposed in the joints of the robot monitors a torque sensor value $\tau(t_k)$ at each sampling time and stores the value in the storage unit.

Immediately after the robot completes one actual motion, the robot control device searches for a maximum absolute value (peak torque) $\tau_{max,j}$ of joint torques obtained when the robot is driven in Step S-6-5 ($\tau_{max,j}=\max_k|\tau_j(t_k)|$) (S-6-6). Then the robot control device stores the acquired peak torque $\tau_{max,j}$ in the storage unit, as a temporary optimum torque value $\tau_{max}$ ($\tau_{max,j} \rightarrow \tau_{max}$) (S-6-7).

In Step S-6-8, the robot control device compares a maximum allowable value $\tau_r$ ($\tau_r$>0) of joint torque with the measured joint-torque peak value $\tau_{max,j}$, and calculates an excess percentage $\alpha_j$ of torque by using the following equation.

$$\alpha_j = (\tau_{max,j} - \tau_r)/\tau_r$$

Here, the maximum allowable value $\tau_r$ of joint torque is predetermined by using a desired endurance time (life) and a rated torque of the reduction gears. The excess percentage $\alpha_j$ has a positive value when the peak value $\tau_{max,j}$ exceeds the maximum allowable value $\tau_r$, and the value of the excess percentage $\alpha_j$ is expressed by normalizing the excess of the peak torque by the maximum allowable torque $\tau_r$. In contrast, when the excess percentage $\alpha_j$ has a negative value, the joint torque in operation is smaller than the maximum allowable torque $\tau_r$, and thus has a margin. In this case, the robot can be moved faster while keeping its life, by more sharply changing the acceleration.

The steps S-6-9 to S-6-11 are a termination determining process which determines a condition specified in the end of the optimum value search of the optimum acceleration-and-deceleration search mode. These steps determine which of the optimum acceleration-and-deceleration search mode and the normal mode (joint torque monitor mode) is to be executed when this operation is performed in the next cycle, and the determination result will be set to the operation-mode switching flag adjustJerk$_m$ (S-6-20).

In Step S-6-9, the robot control device evaluates the excess percentage of joint torque, and determines whether the joint torques obtained when the robot is actually moved are within a desired range. Specifically, while moving the hand of the robot along a predetermined path, the robot control device compares a measurement value of the load torque measured by a torque sensor, disposed in the driving-force transmission system of each joint, with an allowable range of load torque which is set in each joint.

The allowable range is expressed as $\varepsilon_1$ ($\varepsilon_1$>0). When $|\alpha_j|<\varepsilon_1$, the robot control device determines that the torque is within the allowable range (S-6-9: Yes), and proceeds to Step S-6-20. In Step S-6-20, the robot control device sets the normal mode to the operation mode of the next cycle (0→adjustJerk$_m$), completes the operation (Operation m) of this cycle, and transitions to the next operation (Operation m+1). In Step S-6-9, if $|\alpha_j|\geq\varepsilon_1$, then the robot control device determines that the optimum value is not within the allowable range (S-6-9: No), and proceeds to the next step S-6-10.

Here, $\varepsilon_1$ represents an allowable range which indicates how close the actual peak torque $\tau_{max}$ can be to the maximum allowable torque $\tau_r$, that is, how much the residual can be allowed. For example, when $\varepsilon_1$=0.01, the acceleration-and-deceleration adjustment (that is, search for an optimum jerk limiting value) will be performed until the difference between the actual peak torque and the maximum allowable torque falls within a range of 1% of the maximum allowable torque.

In Step S-6-10, the possibility of convergence in the acceleration-and-deceleration search is determined. That is, the robot control device compares a peak torque $\tau_{max,j-1}$ obtained in the last cycle and the peak torque $\tau_{max,j}$ obtained in the current cycle. If the difference is smaller than a predetermined value $\varepsilon_2$ ($\varepsilon_2$>0) ($|\tau_{max,j}-\tau_{max,j-1}|<\varepsilon_2$), then the robot control device determines that more improvement will not be done (Step S-6-10: Yes). Then the robot control device sets the normal mode to the operation mode of the next cycle (S-6-20), completes the current operation, and transitions to the next operation. Here, when the robot is driven for the first time in this operation, the parameter $\tau_{max,j-1}$ is zero.

If $|\tau_{max,j}-\tau_{max,j-1}|\geq\varepsilon_2$, then the robot control device proceeds to Step S-6-11, and checks the number j of repetitions of the acceleration-and-deceleration search mode of the current operation. If the number j of repetitions exceeds a predetermined maximum value $j_{max}$, then the robot control device determines that the current parameter β is optimum and more improvement will not be done (Step S-6-11: No), and sets the normal mode to the operation mode of the next cycle. If the number j of repetitions is equal to or smaller than the predetermined maximum value, the robot control device increments the number of repetitions by one (j+1→j) (Step S-6-12), and proceeds to a jerk-limiting adjustment process (steps S-6-13 to S-6-17) to adjust the jerk limiting value for the next operation.

In the steps S-6-13 to S-6-17, the optimizing calculation is performed to adjust the jerk limiting value to optimize the operation time.

The robot control device checks the sign of the excess percentage $\alpha_j$ of torque (Step: S-6-13), and changes the jerk limiting value β, used as a limiting condition by the minimum-time control unit, depending on whether the sign is positive or negative.

If the sign of the excess percentage $\alpha_j$ of torque is negative (Step S-6-13: No), the robot control device increases the jerk limiting value β, used as a limiting condition by the minimum-time control unit, more than a value used in the current cycle by a×100 percent ((1+a)·β→β). That is, the acceleration and deceleration in the next cycle is set to be more sharply (S-6-14).

In other words, when a measurement value of the load torque of one of the joints is within an allowable range and the measurement value has a margin to a limited value of the allowable range by a predetermined value or more, the next operation is controlled as follows.

That is, while moving the hand of the robot along a predetermined path, the robot control device adjusts the rate of change in acceleration of the driving-force transmission system of each joint so that the load torque applied to a driving-force transmission system of the one joint becomes close to the limited value of the allowable range.

When measurement values of the load torque of a plurality of joints are within an allowable range and the measurement values have margins to a limited value of the allowable range by a predetermined value or more, the next operation is controlled as follows. That is, the robot control device adjusts the rate of change in acceleration of the driving-force transmission system of each joint so that the load torque applied to a driving-force transmission system of one of the joints whose measurement value has the largest margin to the limited value becomes close to the limited value of the allowable range. Alternatively, the robot control device adjusts the rate of change in acceleration of the driving-force transmission system of each joint so that the load torque applied to a driving-force transmission system of one of the joints which is farthest from the hand of the robot becomes close to the limited value of the allowable range. This adjustment is performed for effectiveness. Here, the joint that is farthest from the hand of the robot can be said to be closest to the base on which the robot is disposed.

The robot control device then determines whether the updated jerk limiting value reaches a predetermined upper limit $\beta_u$ (Step S-6-16). If β is equal to or smaller than $\beta_u$ (S-6-16: Yes), the robot control device proceeds to Step S-6-21, and sets the optimum acceleration-and-deceleration search mode to the next operation mode (1→adjustJerk$_m$), and completes the current operation (Operation m). On the other hand, when the updated jerk limiting value β is larger than $\beta_u$ (S-6-16: No), the robot control device determines that more sharp change in command value will not effectively shorten the operation time. Thus, the robot control device proceeds to Step S-6-20, sets the normal mode (torque monitor mode) to the next operation mode, completes the current operation, and transitions to the next operation.

Next, the description will be made for the case where the sign of the excess percentage $\alpha_j$ of torque is positive ($\alpha_j>0$) (Step S-6-13: Yes). In this case, since the change in command value is too sharp, the robot is vibrating, causing the joint torque to exceed the maximum allowable value. Thus, to smoothen the change in command value, it is necessary to decrease the jerk limiting value β, used as the limiting condition by the minimum-time control unit. In Step S-6-15 which follows Step S-6-13, the robot control device decreases the jerk limiting value β from a value used in the current cycle, by b×100 percent ((1−b)·β→β). Here, the ratio for updating the jerk limiting value varies depending on the positive or negative sign of the excess percentage, and a<b. This is because, if a=b, the updated jerk limiting value will become identical when the sign of the excess percentage changes, which will cause vibration. That is, if the limited value of torque is exceeded, the mechanism will probably be damaged. For this reason, the limiting value β is greatly decreased. In contrast, the limiting value β is gradually increased for preventing the limited value of torque from being abruptly exceeded.

In other words, when a measurement value of the load torque of one of the joints exceeds an allowable range for the load torque, the next operation is controlled as follows.

That is, while moving the hand of the robot along a predetermined path, the robot control device adjusts the rate of change in acceleration of the driving-force transmission system of each joint so that the load torque applied to a driving-force transmission system of the one joint is within the allowable range.

When measurement values of the load torque of a plurality of joints exceed an allowable range for the load torque, the next operation is controlled as follows. That is, while moving the hand of the robot along a predetermined path, the robot control device adjusts the rate of change in acceleration of the driving-force transmission system of each joint so that the load torque applied to a driving-force transmission system of one of the joints which is most separated from the allowable range is within the allowable range. Alternatively, the robot control device adjusts the rate of change in acceleration of the driving-force transmission system of each joint so that the load torque applied to a driving-force transmission system of one of the joints which is farthest from the hand of the robot is within the allowable range. This adjustment is performed for effectiveness. Here, the joint that is farthest from the hand of the robot can be said to be closest to the base on which the robot is disposed.

After updating the jerk limiting value β in Step S-6-15, the robot control device checks if the updated limiting value β is lower than a predetermined value $\beta_1$ (S-6-17). Here, when β is decreased, the motion of the robot is slowed by decreasing the change in command value. However, even with a trajectory which causes no vibration, a joint torque larger than the predetermined torque may be caused by some trouble in the sensor system or the control system, in the motion of the robot. Thus, if the limiting value β is lower than the predetermined lower limit ($\beta<\beta_1$) (Step S-6-17: No), the robot control device causes the robot to issue an alarm indicating the trouble (S-6-18), and causes the robot to stop (S-6-19).

On the other hand, if the limiting value β is within the predetermined range (Step S-6-17: Yes), the robot control device proceeds to Step S-6-21, sets the optimum acceleration-and-deceleration search mode to the next operation mode, and completes the current operation.

The whole of the optimizing control of acceleration-and-deceleration pattern of the present embodiment has been described in the above. With such operations repeated, the acceleration-and-deceleration pattern of the robot is automatically adjusted to achieve the minimum cycle time of operation, in a range where the joint torque does not exceed the maximum torque which has been set. Specifically, the difference between a peak value of measurement values of load torque and a limited value of an allowable range is calculated, then an optimization problem in which the difference serves as a target function is solved, and thereby the optimum operation can be achieved while a maximum allowable torque of the reduction mechanism is not exceeded and the durability is ensured.

Figure 8:
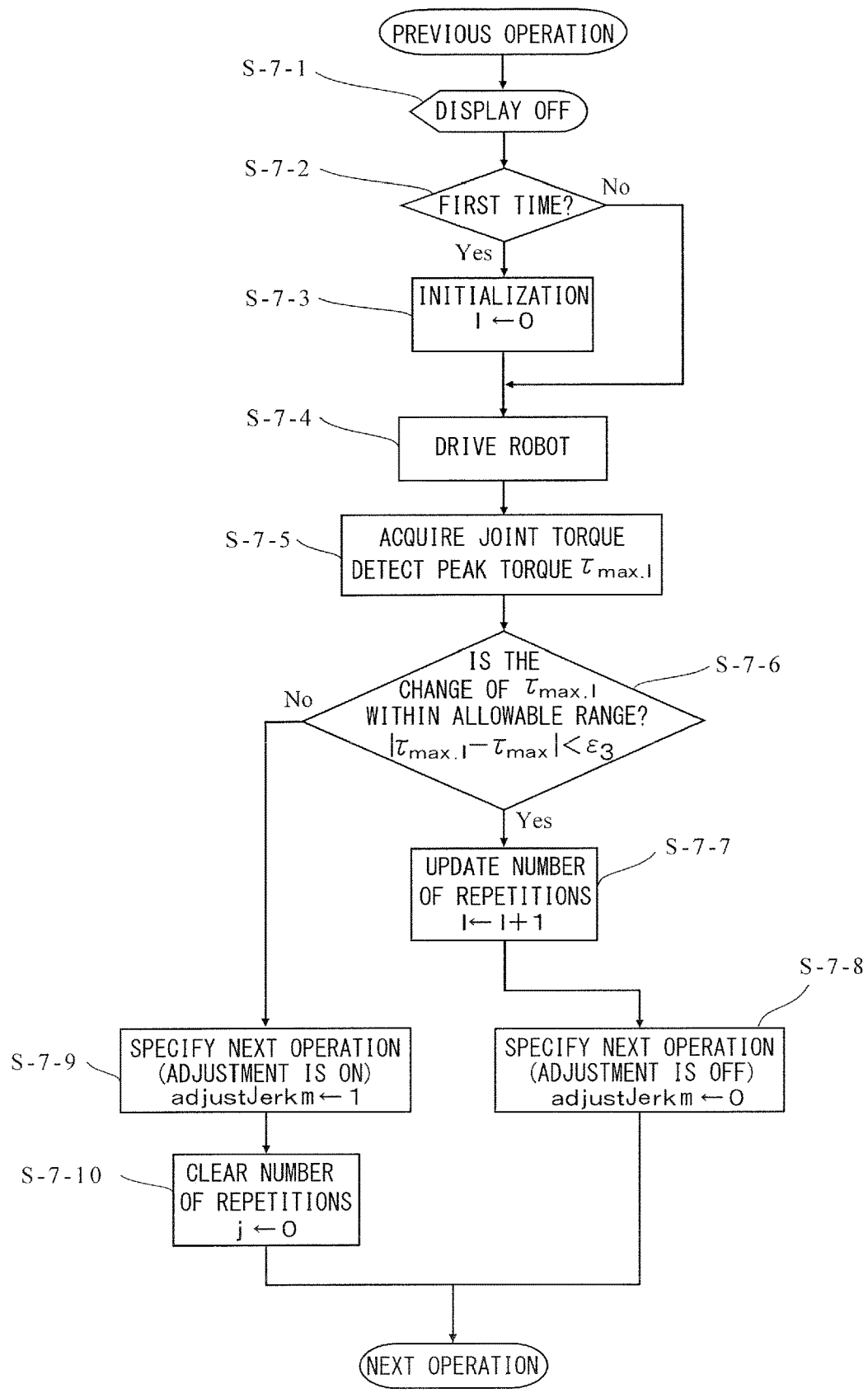
FIG. 8 is a flowchart illustrating a normal mode (torque monitor mode) of a unit operation of the embodiment.

Next, with reference to the flowchart of FIG. 8, the process of the normal mode (joint torque monitor mode) of FIG. 5 will be described. The robot control device switches the mode to the normal mode in the determination process of Step S-5-1 of FIG. 5, and performs control in accordance with the flow of FIG. 8.

The main role of the normal mode is to monitor the joint torque while the robot is driven. The normal mode is performed, after the convergence is achieved in the optimum acceleration-and-deceleration search mode of FIGS. 6 and 7 and the acceleration and deceleration are optimized. In the normal mode, the two optimizing-calculation processes (the minimum-time control and the optimum jerk-limiting-value search) to optimize the acceleration and deceleration are not performed. In the normal mode, the robot is moved by repeatedly using a joint trajectory (joint angle command values) which has been calculated at the last of the optimum acceleration-and-deceleration search mode. This is because the minimum-time control needs high calculation cost as previously described, and because even a little less than 1 second for the minimum-time control should be eliminated for productivity.

First, the robot control device which has started the normal mode turns off the status lamp of the robot, which is turned on in the optimum acceleration-and-deceleration search mode for indicating the state of the control mode, to indicate that the control mode of the robot has been switched to the normal mode (S-7-1).

In Step S-7-2, the robot control device determines whether the robot control device is executing the normal mode for the first time, to count the number 1 of repetitions of the normal mode (Step S-7-2). The robot control device sets 0 to the number 1 (Step S-7-3) if the robot control device is executing the normal mode for the first time, or skips Step S-7-3 and executes Step S-7-4 if not.

In Step S-7-4, the robot control device actually drives the robot in accordance with a joint trajectory created at the last of the optimum acceleration-and-deceleration search mode, to cause the robot to perform actual work. While the robot actually works, each of the torque sensors disposed in the joints of the robot monitors a torque sensor value at intervals of a sampling time. In Step S-7-5, the robot control device stores a maximum absolute value of the torque sensor values in the storage unit, as a peak torque $\tau_{max,1}$ (joint torque monitoring).

In Step S-7-6, the robot control device checks the degree of change of the peak torque $\tau_{max,1}$ monitored in this cycle, and thereby determines whether to readjust the acceleration-and-deceleration control. Specifically, the robot control device compares the current peak torque $\tau_{max,1}$ with the peak torque (the maximum peak torque) $\tau_{max}$ measured in the operation of the optimum acceleration-and-deceleration control of the optimum acceleration-and-deceleration search mode, and thereby determines whether the difference is larger than a predetermined value $\varepsilon_3$. Here, the peak torque $\tau_{max}$ is a value obtained finally in the optimum acceleration-and-deceleration search mode.

If the difference is small, that is, if $|\tau_{max,1}-T\tau_{max}|<\varepsilon_3$ (Step S-7-6: Yes), the robot control device updates the number of repetitions of the normal mode in Step S-7-7 (1+1→1).

Furthermore, the robot control device sets 0 to the operation-mode switching flag adjustJerk$_m$ so that the normal mode is continuously performed in the next cycle (S-7-8), and completes the current operation.

When the difference is larger than the predetermined value, that is, if $|\rho_{max,1}-t_{max}|\geq\varepsilon_3$ (Step S-7-6: No), the difference may be caused by, for example, change over time of load of the mechanism of the robot, change in operating environment such as room temperature, or change in mass of an object, such as the hand, held by the robot. Thus, the robot control device sets 1 to the operation-mode switching flag adjustJerk$_m$ to perform the operation of the next cycle in the optimum acceleration-and-deceleration search mode (S-7-9). In Step S-7-10, the robot control device clears the number of repetitions of the optimum acceleration-and-deceleration search mode (0→j), completes the current operation, and transitions to the next operation.

With this process, the robot control device will readjust the acceleration-and-deceleration (jerk) parameter, and perform the optimum acceleration-and-deceleration control in accordance with a changed driving condition.

Since the robot control device performs, in this manner, the normal mode that does not adjust acceleration and deceleration, the trajectory planning calculation (the minimum-time control) that takes time does not have to be performed every time. As a result, the total cycle time can be shortened. In addition, since the peak monitoring of joint torque is continuously performed, the process can quickly return to the optimum acceleration-and-deceleration search mode anytime when the peak torque changes. With this operation, the optimum acceleration-and-deceleration control can be performed so as to immediately adapt the change in use condition or environment.

Next, some effects produced when the robot is moved by performing the optimizing control of the present embodiment will be described with reference to FIGS. 10A to 11B. For facilitating understanding, FIGS. 10A to 11B illustrate results of operations in which only the first joint J1 was driven and the postures of the other joints were not changed. In addition, each of the graphs illustrates response in time of the torque of the joint J1, obtained when the joint J1 was pivoted by 1.0 radian for positioning the robot.

Figure 10A:
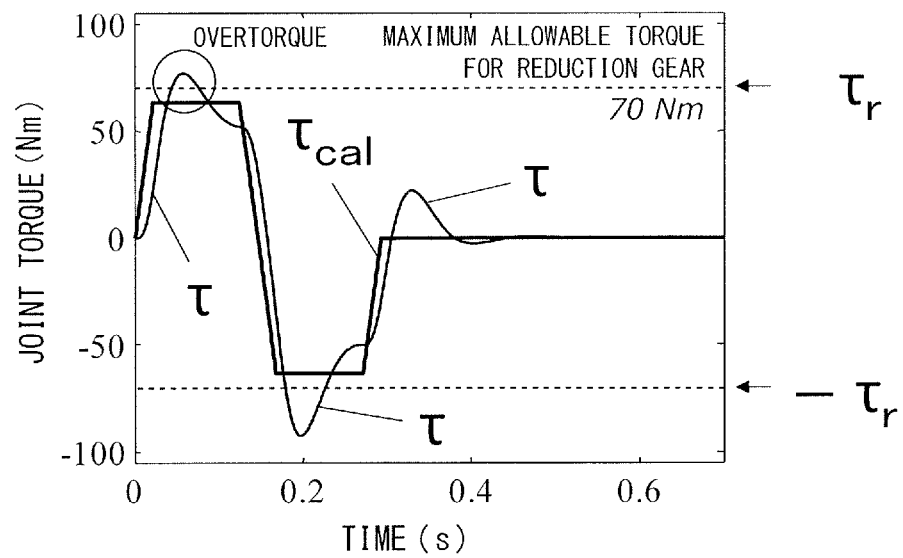
FIG. 10A is a graph illustrating joint torque obtained when the robot is driven by using initial parameters obtained before learning/adjustment.
Figure 10B:
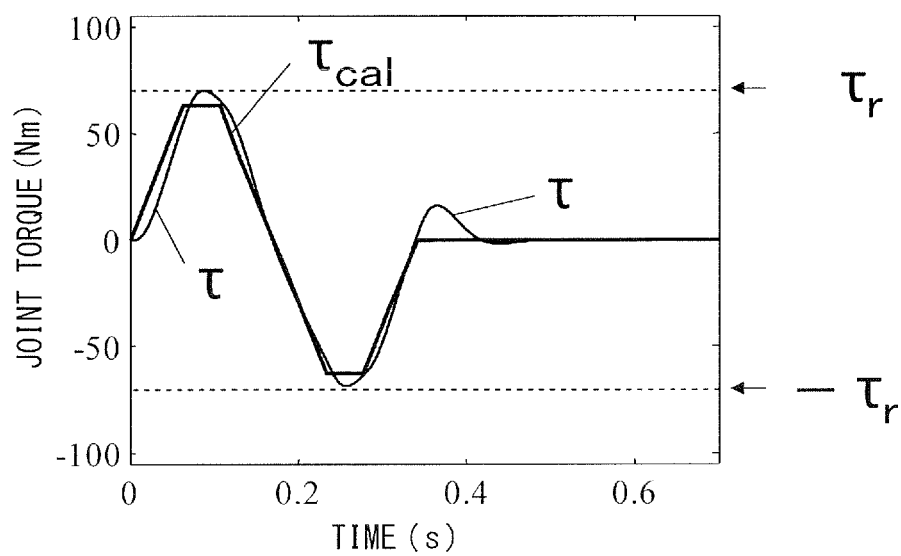
FIG. 10B is a graph illustrating joint torque obtained when the robot is driven by using parameters obtained after learning/adjustment.

In FIGS. 10A and 10B, the robot was postured so that the moment of inertia of the joint J1 was about 1.0 kg·m². This posture was taken such that the robot arm was positioned in almost a middle portion of a space in which the robot arm can move. The robot can be easily operated in this posture; and the posture is very often taken in actual process.

FIG. 10A illustrates response of the joint torque obtained when the robot was driven for the first time. Specifically, FIG. 10A illustrates a result obtained when the robot was driven by using a joint trajectory created by using a default jerk limiting value. The default jerk limiting value is a value obtained before the acceleration and deceleration was optimized. The default jerk limiting value $\beta_0$ was 2500 rad/s³. This setting is also applied to the following description.

In FIG. 10A, the symbol $\tau_r$ denotes a maximum allowable value of joint torque, and a symbol $\tau$ denotes joint torque response obtained when the robot was driven. In addition, a symbol $\tau_{cal}$ denotes torque which was obtained by calculation based on inverse kinematics, by using command values for the robot. The torque is a joint torque in a simulation model which was used by the minimum-time control unit when the command values for the robot were created.

The value of $\tau_r$ was 70 N·m, which was determined with reference to a rated torque (a value in specifications) of the reduction gear.

As can be seen in FIG. 10A, since the joint torque exceeded the maximum allowable value in a circled portion, the robot was not desirably driven in terms of ensuring durability of the robot mechanism. In this time, the peak torque $\tau_{max}$ was 92.3 N·m, and the operation time of the robot, that is, the time $t_f$ taken for executing the joint angle command value was 0.293 s.

Here, although the minimum-time control unit created a trajectory (command value) so that $\tau_{cal}$ has a margin to the maximum allowable torque, the robot, which was actually driven with the command value, vibrated due to the elasticity of the joint. Thus, the vibration torque exerted load (torque) larger than the strength of the driving system, on the joint. The maximum allowable torque was exceeded because the change in command value was too sharp, and because there was a difference between the simulation model (rigid-body model) used by the minimum-time control unit and the actual robot having a structural property including flexibility.

The graph of FIG. 10B illustrates a result obtained when the robot was driven by using a trajectory in which the acceleration pattern (jerk limiting value) was optimized by executing the optimum acceleration-and-deceleration search mode of the present embodiment.

In this case, the jerk limiting value $\beta_0$ was adjusted and reduced to 860 rad/s³. Since the change in command value was smoothened, the vibration was suppressed, and the joint torque was adjusted so as to be lower than the maximum allowable torque of the driving system. In this time, the peak torque $\tau_{max}$ was 70.0 N·m, and the operation time $t_f$ of the robot was 0.341 s.

As can be seen from this result, in the acceleration-and-deceleration control of the present embodiment, even when the robot is driven in an initial state, with a pattern which causes the joint torque to exceed an allowable limit, the jerk is automatically adjusted so that a smooth trajectory to suppress a sharp acceleration-and-deceleration pattern is created. Thus, an optimum (shortest) trajectory is created while durability of the driving system is ensured.

Figure 11A:
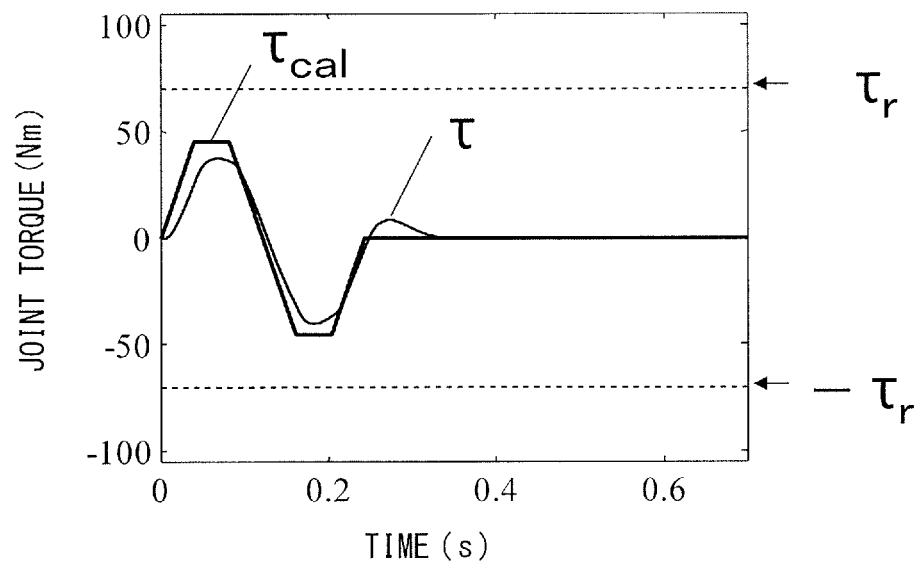
FIG. 11A is a graph illustrating joint torque obtained when the robot is driven in another posture by using initial parameters obtained before learning/adjustment.
Figure 11B:
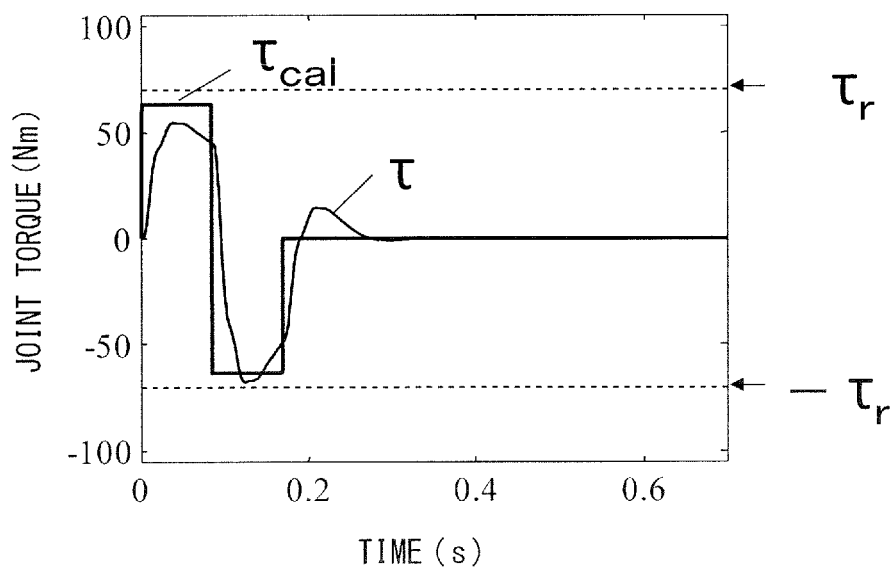
FIG. 11B is a graph illustrating joint torque obtained when the robot is driven in the other posture by using parameters obtained after learning/adjustment.

FIGS. 11A and 11B illustrate response in time of the joint torque, obtained when the posture of the robot was changed from that of FIGS. 10A and 10B and the joint J1 was pivoted by 1.0 radian. The arm was folded so that the moment of inertia of the joint J1 was 0.3 kg·m².

FIG. 11A illustrates a result obtained when the robot was driven in accordance with a trajectory created by using an initial parameter $\beta_0$=2500 rad/s³. FIG. 11B illustrates response obtained when the robot was driven by using a trajectory created by using an optimum jerk limiting value, which was obtained after the search.

Since the arm was folded, the inertia was small in the posture. Thus, in the result of FIG. 11A obtained when the robot was driven by using a default parameter, the response of joint torque had less vibration and was smooth. However, since the jerk limiting value used when the trajectory was created was too small, the peak value of joint torque was low, having large margin. In this time, the peak torque $\tau_{max}$ was 40.2 N·m, and the operation time $t_f$ of the robot was 0.244 s.

In FIG. 11B, the change in command value was made sharp by relaxing the jerk limitation, to optimize the large margin of torque and shorten the cycle time. In FIG. 11B, the torque $\tau_{cal}$ was changed like a step.

In this time, the operation time $t_f$ of the robot was optimized down to 0.169 s, and the peak torque $\rho_{max}$ was 67.5 N·m. The jerk limiting value $\beta$ in this time was 387000 rad/s³. The peak torque $\rho_{max}$ was slightly smaller than the maximum allowable value $\tau_r$ of joint torque. Since the peak torque $\rho_{max}$ cannot be increased near to the maximum allowable value $\tau_r$ any more, the optimum acceleration-and-deceleration search mode was completed when the predetermined number of repetitions was exceeded. Here, the optimum acceleration-and-deceleration search mode was completed because the moment of inertia caused by the posture was small, probably producing not much vibration.

As described above, the acceleration-and-deceleration control of the present embodiment can not only protect the driving system when the joint torque exceeds an allowable limit, but also make the change in command value sharp, when the joint torque has margin, by utilizing the margin. Thus, an optimum trajectory to substantially minimize the operation time can be automatically created, and an optimum acceleration-and-deceleration pattern by which the performance of the mechanism will be sufficiently used can be achieved.

The embodiment of the present invention can achieve optimum acceleration-and-deceleration control that can move the robot at high driving speed without any damage caused by the torque exceeding a maximum allowable torque of joint, and without shortening the life of the robot. In particular, the embodiment can achieve the high operation speed while suppressing damage and deterioration of components, such as reduction gears having less strength.

Furthermore, since the above-described control is performed by using the load torque actually applied to the joint, the acceleration-and-deceleration pattern can be created reliably and optimally. For example, even when the control model is not exactly known, such as when an exact mass of the hand is unknown, the control can be performed.

In addition, the above-described adjustment can be performed even while the robot is performing work, such as assembly work. Furthermore, the adjustment can adapt to any change in workpiece, hand, and operating environment, in real time. Thus, the control system which can be applied to any environment can be achieved by performing the learning by storing the adjustment results in a memory.

Modifications

The embodiments of the present invention are not limited to the above-described embodiments, and thus may be changed or combined as appropriate.

For example, although the above-described embodiments have been described as examples for the case where the six-joint robot having the robot arm 200 is used, the number of joints is not limited to six. In addition, the direction in which the joints are driven is not limited to a rotational direction, and thus the robot may be driven in a linear direction (expansion-and-contraction driving).

In addition, the adjustment algorithm in the jerk-limiting adjustment process is not limited to that of the above-described embodiments, and may be changed within the spirit of the present invention and may be any one of a variety of optimizing algorithms.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-005858, filed Jan. 17, 2018, which is hereby incorporated by reference herein in its entirety.

What is claimed is:

1. A method of controlling a robot device having at least one joint, the robot device being configured to repeatedly move a predetermined portion of the robot device along a predetermined path, the method comprising:
measuring torque applied to a driving-force transmission system of the at least one joint while moving the predetermined portion of the robot device along the predetermined path; and
updating a rate of change in acceleration of the driving-force transmission system in a case where the torque exceeds an allowable range for the torque,
wherein the rate of change in acceleration is not updated when the torque is within the allowable range, and the torque continues to be measured as the predetermined portion of the robot device is moved along the predetermined path.

2. The method according to claim 1, wherein the at least one joint comprises a plurality of joints, and
wherein, in a case where the torque of one of the plurality of joints exceeds the allowable range, the method, while moving the predetermined portion of the robot device along the predetermined path after measuring torque, updates the rate of change in acceleration of each of the plurality of joints so that the torque of the one of the plurality of joints is within the allowable range.

3. The method according to claim 2, wherein, in a case where the torque of one of the plurality of joints is within the allowable range and the torque of a second of plurality of joints has a margin to a limited value of the allowable range by a predetermined value or more, the method, while moving the predetermined portion of the robot device along the predetermined path after measuring torque, updates the rate of change in acceleration of of each of the plurality joints so that the torque of the second of the plurality of joints is within the limited value of the allowable range.

4. The method according to claim 3, wherein the method updates the rate of change in acceleration of each of the plurality of joints so that the torque of the one of the plurality of joints becomes within 1% of the limited value of the allowable range.

5. The method according to claim 2, wherein, in a case where the torque of the plurality of joints exceeds the allowable range, the method, while moving the predetermined portion of the robot device along the predetermined path after measuring torque, updates the rate of change in acceleration of each of the plurality of joints so that the torque that is most separated from the allowable range is within the allowable range.

6. The method according to claim 2, wherein, in a case where the torque of the plurality of joints is within the allowable range and the torques of the plurality of joints have margins to a limited value of the allowable range by a predetermined value or more, the method, while moving the predetermined portion of the robot device along the predetermined path after measuring torque, updates the rate of change in acceleration of each of the plurality of joints so that the torque that has a largest margin to the limited value of the allowable range is within the limited value of the allowable range.

7. The method according to claim 2, wherein, in a case where the torque of the plurality of joints exceeds the allowable range, the method, while moving the predetermined portion of the robot device along the predetermined path after measuring torque, updates the rate of change in acceleration of each of the plurality of so that the torque of one of the plurality of that is farthest from the predetermined portion of the robot device among the plurality of joints of which the torque exceeds the allowable range is within the allowable range.

8. The method according to claim 2, wherein, in a case where the torque of the plurality of joints is within the allowable range and the torques of the plurality of joints have margins to a limited value of the allowable range by a predetermined value or more, the method, while moving the predetermined portion of the robot device along the predetermined path after measuring torque, updates the rate of change in acceleration of each of the joints so that the torque of one of the plurality of joints that is farthest from the predetermined portion of the robot device among the plurality of joints that are within the allowable range is within the limited value of the allowable range.

9. The method according to claim 2, wherein, in a case where the torque of each of the plurality of joints is within the allowable range, the method, after measuring torque, does not update the rate of change in acceleration of each of the joints.

10. The method according to claim 2, wherein the driving-force transmission system comprises a reduction gear, and wherein the allowable range is predetermined by using a desired endurance time and a rated torque of the reduction gear.

11. The method according to claim 1, wherein the torque of the at least one joint is measured by using a torque sensor, and
wherein the torque sensor measures output torque of a reduction mechanism of the driving-force transmission system of the at least one joint.

12. A method of manufacturing a product, the method comprising:
preparing a work; and
assembling or machining the work by moving the predetermined portion of the robot device along the predetermined path by using the method according to claim 1.

13. A computer-readable non-transitory recording medium storing a control program that causes a computer to execute the method according to claim 1.

14. The method according to claim 1, wherein the robot device comprises a robot hand, and
wherein the predetermined portion is the robot hand.

15. The method according to claim 1, wherein the predetermined path is defined by series of teaching points that are optimized under limiting conditions.

16. The method according to claim 15, wherein the predetermined path is defined so as to substantially minimize an operation time of the robot device while keeping physical consistency.

17. The method according to claim 1, wherein, in the updating a rate of change in acceleration of the joint, a parameter used to define the predetermined path is updated.

18. A robot device comprising:
at least one joint; and
a control unit,
wherein the control unit is configured to:
repeatedly move a predetermined portion of the robot device along a predetermined path,
measure torque applied to a driving-force transmission system of the joint while moving the predetermined portion of the robot device along the predetermined path,
in a case where the torque exceeds an allowable range, update a rate of change in acceleration of the driving-force transmission system, and
in a case where the torque is within the allowable range, not update the rate of change in acceleration as the predetermined portion of the robot device is moved along the predetermined path.

19. The robot device according to claim 18, wherein the at least one joint comprises a plurality of joints, and
wherein, in a case where the torque of one of the plurality of joints exceeds the allowable range, the method, while moving the predetermined portion of the robot device along the predetermined path after measuring torque, updates the rate of change in acceleration of each of the plurality of joints so that the torque of the one of the plurality of joints is within the allowable range.

20. The robot device according to claim 19, wherein, in a case where the torque of one of the plurality of joints is within the allowable range and the torque of a second of plurality of joints has a margin to a limited value of the allowable range by a predetermined value or more, the method, while moving the predetermined portion of the robot device along the predetermined path after measuring torque, updates the rate of change in acceleration of of each of the plurality joints so that the torque of the second of the plurality of joints is within the limited value of the allowable range.

21. The robot device according to claim 19, wherein, in a case where the torque of the plurality of joints exceeds the allowable range, the method, while moving the predetermined portion of the robot device along the predetermined path after measuring torque, updates the rate of change in acceleration of each of the plurality of joints so that the torque that is most separated from the allowable range is within the allowable range.

22. The robot device according to claim 19, wherein, in a case where the torque of the plurality of joints is within the allowable range and the torques of the plurality of joints have margins to a limited value of the allowable range by a predetermined value or more, the method, while moving the predetermined portion of the robot device along the predetermined path after measuring torque, updates the rate of change in acceleration of each of the plurality of joints so that the torque that has a largest margin to the limited value of the allowable range is within the limited value of the allowable range.

23. The robot device according to claim 19, wherein, in a case where the torque of the plurality of joints exceeds the allowable range, the method, while moving the predetermined portion of the robot device along the predetermined path after measuring torque, updates the rate of change in acceleration of each of the plurality of joints so that the torque of one of the plurality of joints that is farthest from the predetermined portion of the robot device among the plurality of joints of which the torque exceeds the allowable range is within the allowable range.

24. The robot device according to claim 19, wherein, in a case where the torque of the plurality of joints is within the allowable range and the torques of the plurality of joints have margins to a limited value of the allowable range by a predetermined value or more, the method, while moving the predetermined portion of the robot device along the predetermined path after measuring torque, updates the rate of change in acceleration of each of the joints so that the torque of one of the plurality of joints that is farthest from the predetermined portion of the robot device among the plurality of joints that are within the allowable range is within the limited value of the allowable range.

25. The robot device according to claim 19, wherein, in a case where the torque of each of the plurality of joints is within the allowable range, the method, after measuring torque, does not update the rate of change in acceleration of each of the joints.

26. A robot control device comprising:
a processor; and
a memory,
wherein the processor is configured to:
repeatedly move a predetermined portion of a robot device along a predetermined path,
measure torque applied to a driving-force transmission system of the joint while moving the predetermined portion of the robot device along the predetermined path,
in a case where the torque exceeds an allowable range, update a rate of change in acceleration of the driving-force transmission system, and
in a case where the torque is within the allowable range, not update the rate of change in acceleration, and the torque continues to be measured as the predetermined portion of the robot device is moved along the predetermined path.

* * * * *